United States Patent
Iftimie et al.

(10) Patent No.: US 8,474,022 B2
(45) Date of Patent: Jun. 25, 2013

(54) SELF-SERVICE CREDENTIAL MANAGEMENT

(75) Inventors: Sorin Iftimie, Issaquah, WA (US);
Ikrima Elhassan, Seattle, WA (US);
Bruce P. Bequette, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 1486 days.

(21) Appl. No.: 11/763,880

(22) Filed: Jun. 15, 2007

(65) Prior Publication Data

US 2008/0313731 A1  Dec. 18, 2008

(51) Int. Cl.
*G06F 21/00* (2006.01)

(52) U.S. Cl.
USPC .......... 726/6; 726/1; 726/5; 726/18; 713/166; 713/168; 709/223; 709/224; 380/47; 705/51; 455/411

(58) Field of Classification Search
USPC ........................................................ 726/5, 6
See application file for complete search history.

(56) References Cited

U.S. PATENT DOCUMENTS

| | | |
|---|---|---|
| 5,991,882 A | 11/1999 | O'Connell |
| 6,105,010 A | 8/2000 | Musgrave |
| 6,131,120 A | 10/2000 | Reid |
| 6,360,322 B1 | 3/2002 | Grawrock |
| 6,618,806 B1 | 9/2003 | Brown et al. |
| 6,941,468 B2 | 9/2005 | Johnson |
| 6,950,935 B1 | 9/2005 | Allavarpu et al. |
| 6,954,792 B2 | 10/2005 | Kang et al. |
| 6,973,575 B2 | 12/2005 | Arnold |
| 7,080,077 B2 | 7/2006 | Ramamurthy et al. |
| 7,085,834 B2 | 8/2006 | Delany et al. |
| 7,107,220 B2 | 9/2006 | Novak et al. |
| 7,134,137 B2 | 11/2006 | Joshi et al. |
| 7,260,830 B2 * | 8/2007 | Sugimoto ......................... 726/1 |
| 7,263,717 B1 * | 8/2007 | Boydstun et al. ................. 726/4 |
| 7,577,834 B1 * | 8/2009 | Traversat et al. ............. 713/156 |
| 2002/0091798 A1 * | 7/2002 | Joshi et al. ..................... 709/219 |
| 2004/0064742 A1 * | 4/2004 | Excoffier et al. ............. 713/202 |
| 2004/0123151 A1 * | 6/2004 | Mizrah ......................... 713/201 |
| 2004/0128394 A1 | 7/2004 | Knauerhase et al. |
| 2004/0225662 A1 * | 11/2004 | Nojima .......................... 707/10 |
| 2004/0243824 A1 * | 12/2004 | Jones ............................ 713/200 |

(Continued)

OTHER PUBLICATIONS

Seamons et al., "Negotiating Trust on the Web", IEEE Internet Computing, Nov. • Dec. 2002.*

(Continued)

*Primary Examiner* — Morshed Mehedi
(74) *Attorney, Agent, or Firm* — Merchant & Gould, P.C.

(57) ABSTRACT

A self-service system and method for credential reset permits an administrator to customize policies for credential reset based on any user or group of users. Administrators may choose to set a more stringent policy for credential reset for users or groups that have higher-level permissions to access sensitive information within the resource protected by the credential. Customizable, plug-in gates are provided to permit administrators fine grained control over reset policy definition. When the user initiates a credential reset, the reset policy applicable to that user is invoked, and the user is presented with gates to pass pursuant to the applicable reset policy. The user's responses are compared to responses presented by the user at registration. If the responses meet the reset policy's threshold for accuracy, the user is permitted to reset the credential.

13 Claims, 8 Drawing Sheets

U.S. PATENT DOCUMENTS

| | | | |
|---|---|---|---|
| 2005/0033993 A1* | 2/2005 | Cooper et al. | 713/202 |
| 2005/0097106 A1 | 5/2005 | Lineman | |
| 2005/0138399 A1* | 6/2005 | Cheston et al. | 713/189 |
| 2005/0283614 A1 | 12/2005 | Hardt | |
| 2006/0005020 A1 | 1/2006 | Hardt | |
| 2006/0023887 A1 | 2/2006 | Agrawal et al. | |
| 2006/0037073 A1* | 2/2006 | Juels et al. | 726/17 |
| 2006/0059362 A1 | 3/2006 | Paden et al. | |
| 2006/0059539 A1 | 3/2006 | Shashikumar et al. | |
| 2006/0085845 A1 | 4/2006 | Davis et al. | |
| 2006/0224742 A1* | 10/2006 | Shahbazi | 709/226 |
| 2006/0288406 A1 | 12/2006 | Kuhn et al. | |
| 2007/0016804 A1 | 1/2007 | Kemshall | |
| 2007/0044144 A1 | 2/2007 | Knouse et al. | |
| 2007/0050638 A1 | 3/2007 | Rasti | |
| 2007/0061590 A1 | 3/2007 | Boye et al. | |
| 2007/0239730 A1* | 10/2007 | Vigelette et al. | 707/10 |
| 2007/0250914 A1* | 10/2007 | Fazal et al. | 726/5 |
| 2007/0271601 A1* | 11/2007 | Pomerantz | 726/5 |
| 2008/0086759 A1* | 4/2008 | Colson | 726/2 |
| 2008/0276309 A1* | 11/2008 | Edelman | 726/9 |
| 2008/0313730 A1 | 12/2008 | Iftimie et al. | |

OTHER PUBLICATIONS

Authentication Gets Personal with Biometrics. http://citeseer.ist.psu.edu/cache/papers/cs2/629/http:zSzzSzwww2.hh.sezSzstaffzSzjosefzSzpubli czSzpublicationszSzgarcia04spm.pdf/authentication-gets-personal-with.pdf Secure Continuous Biometric-Enhanced Authentication http://reports-archive.adm.cs.cmu.edu/anon/anon/usr/ftp/2000/CMU-CS-00-134.ps.

Automated and Centralised UNIX Authentication, Account Provisioning and Account Administration http://new.auug.org.au/resources/proceedings/auug2004/papers/koren.pdf.

An Introduction to Identity Management http://www.giac.org/certified_professionals/practicals/gsec/2646.php.

Enhanced Windows-based Warning Terms Separation Proof-of-Concept (POC)—Architecture, Detailed Design & Project Plan http://cradpdf.drdc-rddc.gc.ca/PDFS/unc17/p520645.pdf.

Enterprise Security: Moving from Chaos to Control with Integrated Security Management from NetIQ http://download.netiq.com/Library/White_Papers/NetIQ_wp_Security.pdf.

Jain, et al., "An Introduction to Biometric Recognition", IEEE Transactions on Circuits and Systems for Video Technology, vol. 14, No. 1, Jan. 2004.

Office Action dated Apr. 27, 2010 issued in U.S. Appl. No. 11,763,657.

Response to Office Action dated Jul. 27, 2010 issued in U.S. Appl. No. 11,763,657.

Office Action dated Oct. 14, 2010 issued in U.S. Appl. No. 11,763,657.

Response to Office Action dated Jan. 14, 2011 issued in U.S. Appl. 11,763,657.

* cited by examiner

SELF-SERVICE CREDENTIAL MANAGEMENT

RELATED APPLICATION(S)

The present application is related to U.S. patent application Ser. No. 11/763,657, entitled "Extensible Authentication Management," the specification of which is assigned to the same assignee and is incorporated by reference as if fully set forth herein.

BACKGROUND

Password protection is a popular authentication method for many computer and network resources. However, due to security concerns, users are often forced to change their passwords. This can result in a user forgetting his/her current password and calling a system administrator to reset the password. Password resets consume a large percentage of a system administrator's time.

Self-service password reset systems can alleviate pressure on a system administrator by allowing users to reset their passwords themselves. A user who desires to reset a password may be asked to authenticate himself in some manner. For example, a user may be asked to provide the user's mother's maiden name or provide some other piece of personal information that the user has previously registered with the system. If the user passes the authentication test, the user is permitted to reset his/her password and use it to access the resource. The user's rights to information or access within the resource may then be controlled via a permission setting associated with the user.

It is disadvantageous, however, for self-service password reset systems to require the same level of authentication from all users. Often, there is a wide variety among permission settings for users within the resource. Accordingly, the security risk for unauthorized access to a user's password may be user-specific. For example, a CEO may be provided access to all corporate network files, while a part-time employee may be provided with very little access. As such, an administrator that requires a stringent password-reset test potentially sacrifices usability for the majority of users in favor of protecting the passwords of the users (e.g., the CEO) with the greatest privileges to protected areas within the resource. A less stringent test potentially sacrifices security in favor of usability.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Among other things, the claims recite a self-service system and method for credential reset that permits an administrator to customize credential-reset policies based on any user or group of users. Customizable, plug-in gates are provided to permit administrators fine grained control over reset-policy definition. When the user initiates a credential reset, the reset policy applicable to that user is invoked, and the user is presented with gates to pass pursuant to the applicable reset policy. The user's responses are compared to responses presented by the user at registration. If the responses meet the reset policy's threshold for accuracy, the user is permitted to reset the credential.

One aspect relates to a method for determining whether to permit a user to reset a credential used to access a resource. The method includes receiving a request from a first user to reset a first credential. The first request includes first user information. The method also includes determining, based on the first user information, an applicable reset policy from at least a first reset policy and second reset policy. The first reset policy is different from the second reset policy. The method further includes receiving a response from the first user and granting the request to reset the credential if the response satisfies the applicable reset policy.

Another aspect relates to a computer readable medium encoding a computer program of instructions for executing a computer implemented method for setting requirements to permit reset of a credential used to access a resource. The computer implemented method includes the step of associating a first user with a first reset policy based on first user information. It also includes the step of associating a second user with a second reset policy based on second user information. The first user is required to satisfy the first reset policy to reset a first credential. The second user is required to access the second reset policy to reset a second credential. The first reset policy and the second reset policy are different.

Still another aspect relates to a system for determining whether to allow users to reset credentials protecting a resource. The system includes a processing unit and a memory coupled to and readable by the processing unit. The memory has stored instructions which, when executed by the processing unit, cause a credential reset module to perform certain acts. One act is receiving a first request from a first user to reset a first credential protecting the resource. The first request includes first user information. Another act is to map the first user information to a first reset policy. A first response is received from the first user. The first user is granted permission to reset the first credential if the first response satisfies the first reset policy. Another act is receiving a second request from a second user to reset a second credential protecting the resource. The second request includes second user information. Another act is to map the second user information to a second reset policy. A second response is received from the second user. The second user is granted permission to reset the second credential if the second response satisfies the second reset policy. The first reset policy and second reset policies are different.

Other aspects of other embodiments are set forth in the following Detailed Description and Claims appended hereto.

DESCRIPTION OF THE DRAWINGS

Reference will now be made to the accompanying drawings, which are not necessarily drawn to scale and may describe particular embodiments which are not intended to be limiting in scope, and wherein.

DETAILED DESCRIPTION

Example embodiments will now be described more fully hereinafter with reference to the accompanying drawings. Like numbers refer to like elements throughout.

As used herein, the terms "module," "component," "service," and "system" are intended to refer to a computer-related entity, either hardware, a combination of hardware and software, software, or software in execution. For example, a module can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more modules can reside within a process and/or thread of execution, and a module can be localized on one computer and/or distributed between two or more computers.

Figure 1:
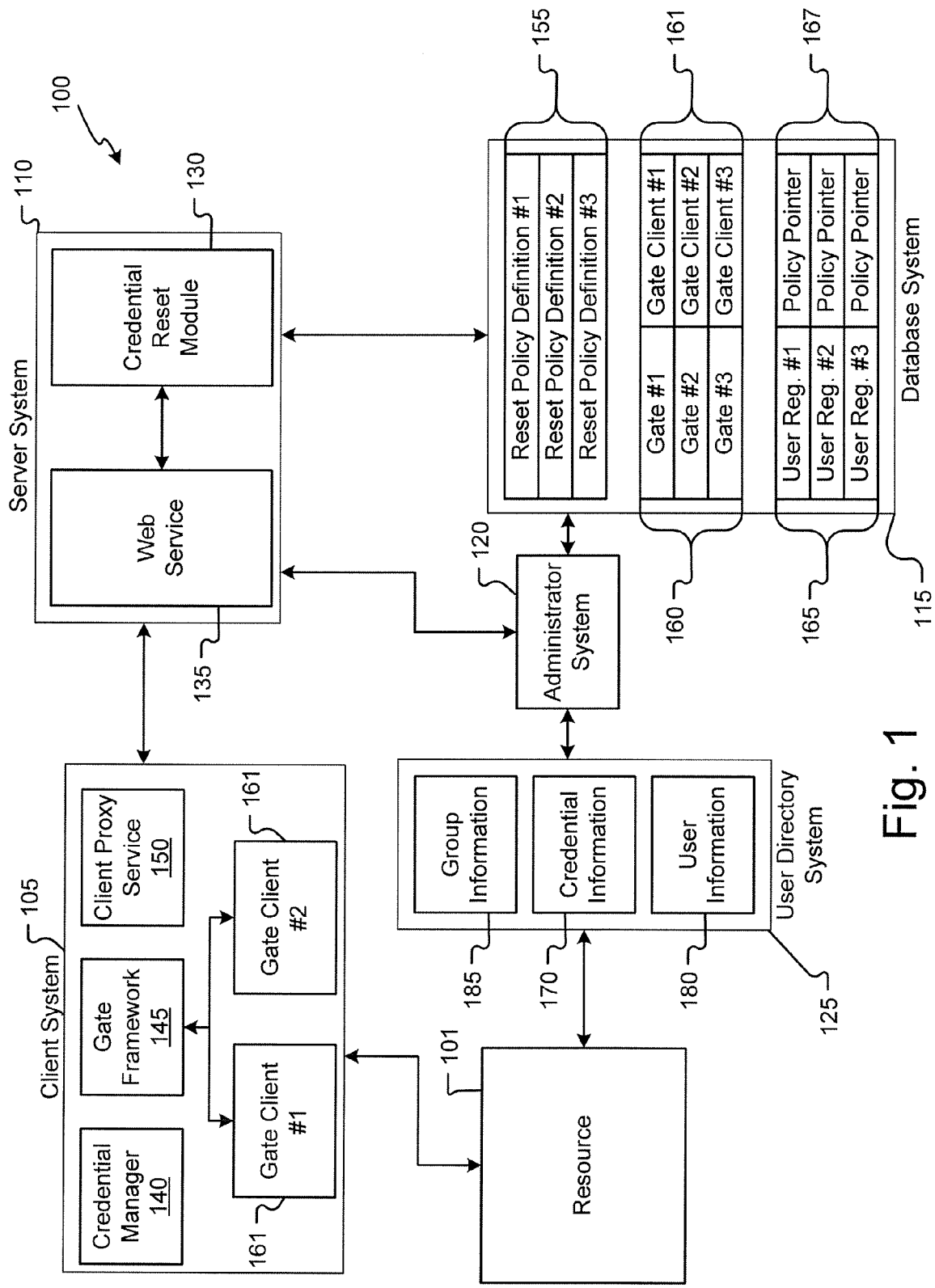
FIG. 1 illustrates an example of a self-service credential reset system.

Referring now to FIG. 1, a system 100 for determining whether to allow users to reset passwords protecting a resource is shown. In an embodiment, system 100 includes a resource 101, a client system 105, a server system 110, a database system 115, an administrator system 120, and a user directory service 125. A user may use a credential, such as a password, to access resource 101, for example via client system 105. The resource 101 may comprise, among other things, a network, file, data, computer, device, or any other credential-protected entity. The credential may include a password, a smartcard pin, or other authentication mechanisms.

In this embodiment, the client system 105 is connected to the server system 110 via communication media, such as the Internet, an intranet, an extranet, etc. Server system 110 is connected to user directory system 125, administrator system 120, and database system 115 via communication media. In some embodiments, one or more of the resource 101, server system 110, database system 115, user directory system 125, and administrator system 120 may comprise a single computing device or may comprise or be implemented on separate computing devices.

Server system 110 includes a credential reset module 130. In embodiments, server system 110 also includes a web service 135 to communicate with client system 105 over a network, such as the Internet. Client system 105 includes a credential manager module 140, a gate framework module 145, and a client proxy service 150. Gate framework 145 makes calls to gate clients 161 as described hereinafter.

The user directory system 125 controls access to resource 101 by checking credentials of users. For example, user directory system 125 may comprise a server computer running Active Directory, a user directory system available from Microsoft Corporation of Redmond, Wash. In embodiments, when a user attempts to log onto the resource 101, resource 101 checks the user name and credential (e.g., password) provided by the user with the user name and credential stored in user directory system 125. If there is a match, the user is permitted access to the resource 101; otherwise, the user is denied access.

In an embodiment, a user may initiate a credential reset through client system 105, such as by clicking on a "reset" button presented through a user interface (UI) by credential manager module 140. The UI may be provided to the credential manager module by gate framework module 145. Credential manager module 140 sends a message to server system 110 through gate framework 145, client proxy service 150 and web service 135 requesting a reset of the user's credential. The request includes user information, such as a user name or a user identification number. Credential reset module 130 uses the user information to check the database system 115 and determine: (a) whether the user has previously registered; and (b) the reset policy that applies to the user. The determination of which reset policy applies to the user may be performed in a variety of ways. For example, a pointer 167 to the applicable reset policy definition 155 that applies to the user may be stored in, and accessed directly from, the database system 115. Alternatively, the credential reset module 130 may access the user directory system 125 to determine whether the user is registered and the "group(s)" to which the user belongs. Groups are discussed further hereinafter. The credential reset module 130 could then determine the applicable reset policy based on logic contained within the credential reset module 130. If the user has not registered using the applicable reset policy, however, the user may receive an error message when attempting to initiate a password reset. Other variations are possible and within the scope of the claimed embodiments.

In an embodiment, the credential reset module 130 accesses the applicable reset policy definition, which may be stored in database 115. The reset policy definition 155 identifies one or more gates 160 that the user must pass in order to reset the user's credential. The gates 160 may also be stored in database 115, and may comprise dynamically linked libraries (DLLs). Different types of gates 160 may be provided. For example, a gate may include one or more questions to be answered by the user (e.g., "What is your mother's maiden name?"). A gate 160 may include a challenge for a user to insert his/her smartcard. Gate 160 types may also include other authentication types, such as a short-message-service (SMS) challenge, a grid-card challenge, or a biometric challenge. Gates 160 of the same type may also have different characteristics. For example, a first gate 160 may include three questions for the user to answer and a second gate 160 may include five different questions for a user to answer.

In addition, different reset policy definitions 155 may identify the same gate(s) 160, but may require a different level of compliance to satisfy the policy. For example, a first policy may require the user to submit a response to a gate 160 that comprises five questions for the user. The first policy may be satisfied by a user answering four of the five questions correctly. A second policy, on the other hand, may require the user to respond to the same gate 160 but require all five questions to be answered correctly in order to satisfy the second policy.

Gates 160 may comprise DLLs that include all of the data associated with the challenges, such as the text of the questions to be asked of the user or instructions on how to comply with a challenge (e.g., "Please scan your fingerprint now."). Gate clients 161, in embodiments, may comprise one or more separate DLL's that include the executables to display the data in gates 160, receive responses to the challenges posed by gates 160, and route the responses appropriately back to server system 110. Because the gates 160 and gate clients 161 may be implemented as a plug-in modules (such as DLL's) the system 100 is extensible. For example, third parties may choose to create new gates that can be imported into database 115 and used by an administrator to create a new access policy.

In addition, gates 160 and gate clients 161 may include gate settings, which may comprise variables that can be customized by an administrator, such as the text of questions to be presented to the users, the language to be employed in presenting challenges to the users, etc. Gate settings may be accessed by administrator system 120 via APIs included in gates 160 and/or gate clients 161 or by other means.

In embodiments, the user registers with the credential reset module 130 prior to attempting to reset the user's credential. The client system 105 stores the client gates 161 identified by the applicable reset policy at the client system 105 when the user registers with the credential reset module 130 (discussed below). When the user requests to reset the user's credential, then, the credential reset module 130 sends only the gate 160 from database 115. Gate framework 145 uses the locally stored executable gate client 161 to display the gate 160 through a UI at credential manager 140. The gate framework 145 calls the appropriate gate client 161 to match the gate 160 that is forwarded by the server system 110. In another embodiment, the server system 110 sends the client gates 161 from database 115 along with the gates 160 to the client system 105 in response to a request from the client system 105.

In embodiments, the gate framework 145 ensures that the client system 105 has stored the correct (and updated) client gates 161 by checking identifiers associated with the client gates 161 stored on the client system 105 against identifiers provided by the server system 110 from database system 115. This is further described in U.S. patent application Ser. No. 11/763,657, entitled "Extensible Authentication Management" the specification of which is assigned to the same assignee and is incorporated by reference as if fully set forth herein.

In embodiments, gates 160 are not stored at client system 105 to make it more difficult for unauthorized users to predict gate challenges and accomplish an unauthorized access. Rather, gates 160 are held in memory (such as RAM) at client system 105 for only long enough to display to the user and receive a user response to the gates 160.

In embodiments, once the gate(s) are presented through a UI to the user, the user responds to the challenges of the gate(s) 160 presented. In one embodiment, a first gate 160 is presented and must be satisfied according to the applicable reset policy before a user is presented with a second gate 160. In some embodiments, challenges (such as questions) within a gate must be responded to by the user before the user is presented with the next challenge within the gate 160. These measures make hacking and unauthorized resetting of credentials more difficult.

Client system 105 submits a response (which may comprise a series of responses to individual challenges or different gates) to the server system 110. In embodiments, the user's inputted response is received from the user and forwarded to server system 110 by gate framework 145 using logic or instructions in client gate 161. In order to limit the possibility of unauthorized access to personal information, in embodiments, the user's inputted response is stored only in memory at client system 105 for the limited period of time necessary to collect and send the response(s) to server system 110. Receiving user responses may require interaction with peripheral devices such as keyboards, biometric scanners, smartcard readers, etc. In embodiments, instructions to control such interactions are included in the gate framework 145 and/or in gate clients 161. The response may be included in a security token, or otherwise encrypted, to be decoded by the server system 110, particularly if the response includes personal information in response to a question that is part of a gate (e.g., social security number, date of birth, etc.). Server system verifies that the response satisfies the applicable reset policy (e.g., by answering correctly at least a minimum number of questions, or satisfying particular challenges, within each gate). Verification of responses may be accomplished, in embodiments, by comparing the response(s) to user registration 165, which may be stored within the database system 115 and indexed to the user. For example, upon registration, the user may be prompted for answers to the five questions that make up a first gate 160. The user's responses are stored as user registration 165, and may be subject to a one-way hash to protect the content of the responses. The hash function can be completed by the gate framework 145 prior to providing the user registration to the server system 110 or database system 115. When the user responds to the challenges within the first gate, authentication module 130 can compare the responses to the user registration 165. User registration 165, in embodiments, is stored with or indexed to a pointer 167 to the applicable policy definition 155 in database 115. Again, the responses may be subjected to the same one-way hash function used by gate framework 145 during registration. Server system 110 can compare the hashed response(s) to the previously hashed user registration 165 to determine if the applicable access policy has been satisfied. Registration is discussed further in relation to FIG. 3.

If the applicable reset policy is satisfied, the user is permitted to reset his/her credential. This can be accomplished, in embodiments, by prompting the user for the new credential through credential manager 140 and saving the user's new credential information 170 in user directory system 125. In embodiments, the resource 101 uses the user directory system 125 to authenticate the user before permitting access to the resource 101.

In embodiments, a system administrator is permitted to create and customize gates and reset policies through administrator system 120. Administrator system 120, in embodiments, has access to user directory system 125, which may include both user information 180 and group information 185. User information comprises user identifying information, such as a user name or user identification number. Group information 185 indicates the group(s) of which the users are members. For example, the accounting department of a corporation could be made members of the "accounting" group. The accounting group, then, is provided via user directory system 125 with certain permissions to information, applications, and utilities on resource 101 that may be different from permissions for other groups.

In embodiments, the system administrator is presented with a UI through administrator system 120 that permits the administrator to: (a) create new reset policies; (b) modify or delete existing reset policies; (c) import new gates; (d) assign and reassign reset policies to user groups or individual users; and (e) delete user registrations 165 if previously applicable reset policies are modified or deleted. For example, an administrator may create a new reset policy choosing a combination of gates. If necessary or desirable, an administrator may import or create a new gate in addition to the gates 160 already defined in database 115. The administrator can then customize the characteristics of the gates and set pass/fail criteria for the gates to create a new reset policy definition 155 to be stored in database 115. The administrator can choose to apply or associate the new reset policy to individual users or groups, for example, the groups defined in user directory system 125. For example, the administrator may store a list of users or groups in credential reset module 130 or database 115 along with a corresponding list of reset policies applicable to each user or group. When a user registers for self-service credential reset, credential reset module 130, in embodiments, checks the user information from the user against the list of corresponding reset policies. In other embodiments, the credential reset module 130 checks a user director service 125 to determine the groups to which the user belongs and checks those groups against the list of corresponding reset policies. Other systems and methods of associating or applying reset policies to users or groups are possible and within the scope of the claims. If the new reset policy is to replace an existing reset policy, the administrator may choose to delete all of the user registrations 165 for users to which the new reset policy applies. In these embodiments, the users may be prompted or required to re-register based on the new reset policy.

Figure 2:
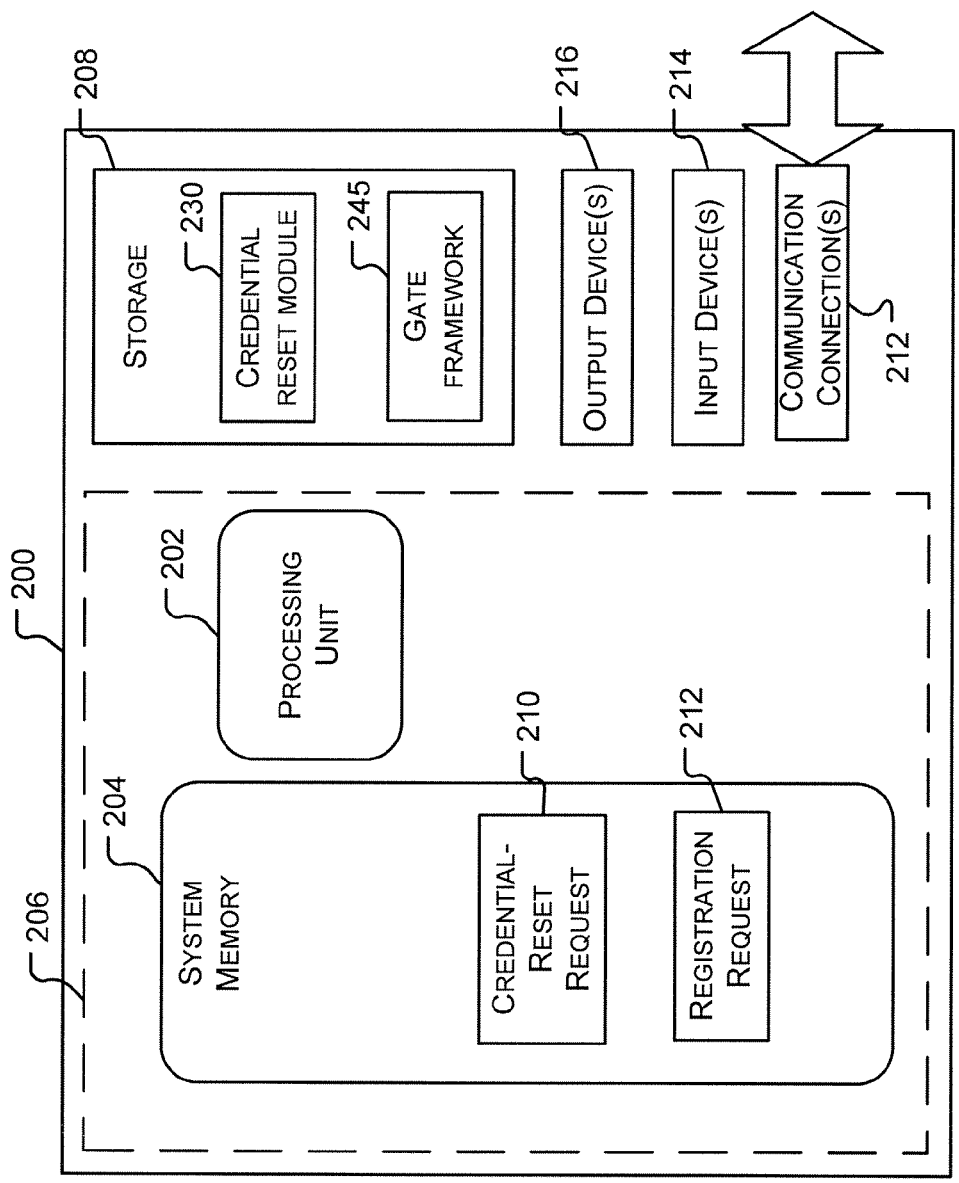
FIG. 2 illustrates an example of a computing device.

FIG. 2 illustrates a general computing device 200, which can be used to implement the embodiments described herein. The computing device 200 is only one example of a computing environment and is not intended to suggest any limitation as to the scope of use or functionality of the computer and network architectures. Neither should the computing device 200 be interpreted as having any dependency or requirement relating to any one or combination of components illustrated in the example computing device 200. In embodiments, computing device 200 may be used, for example, as a client system 205 or server system 210 as described above with respect to FIG. 1.

In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. System memory 204 stores applications that are executing on computing device 200. In addition to applications, memory 204 may also store information being used in operations being performed by computing device 200, such as a credential-reset request 210 and/or a registration request 212, as described below with respect to FIGS. 3-7.

Additionally, computing device 200 may also have additional features/functionality. For example, computing device 200 may also include additional storage 208 (removable and/or non-removable) including, but not limited to, magnetic or optical disks or tape. Such additional storage is illustrated in FIG. 2 by storage 208. Computer storage media includes volatile and nonvolatile, removable and non-removable media implemented in any method or technology for storage of information such as computer readable instructions, data structures, program modules or other data. Memory 204 and storage 208 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 200. Any such computer storage media may be part of computing device 200.

As those with skill in the art will appreciate, storage 208 may store a variety of information. Among other types of information, storage 208 may store a credential reset module 230 (e.g., in the case of a server system) or gate framework 245 (e.g., in the case of a client system).

Computing device 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

Figure 3:
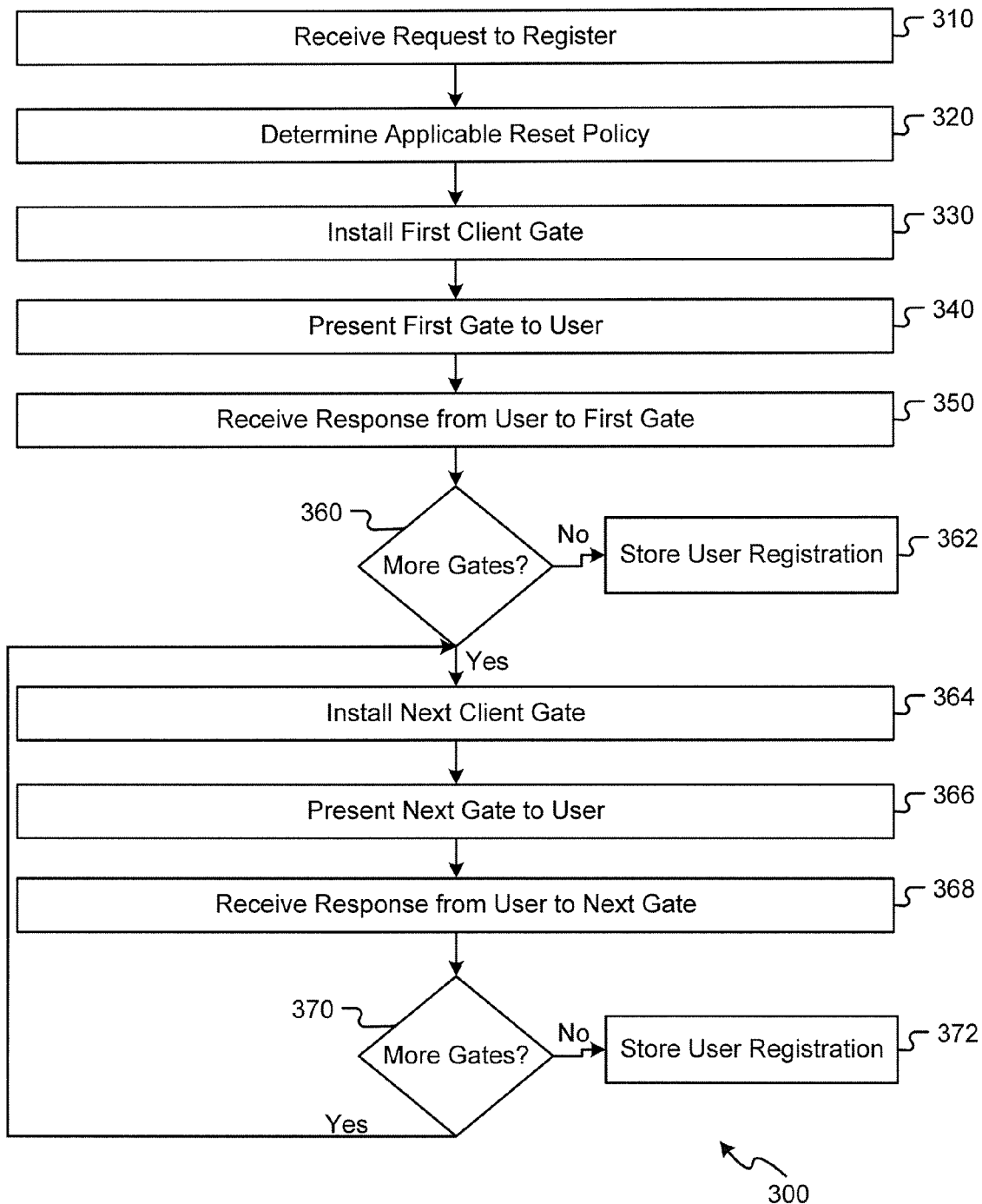
FIG. 3 illustrates an example of a method for self-service credential reset registration.

FIG. 3 is a flow diagram demonstrating an embodiment of a registration method 300. The user requests 310 to register for self-service credential reset. This can be initiated by the user through a UI presented to the user, which the user can select. Alternatively, the user's request can be a response to an email or other communication asking the user to register. For example, an administrator may require all new users to register for self-service credential reset upon first accessing a resource, such as a corporate network. In embodiments, registration for self-service credential reset takes place after a user is authenticated, such as by successfully logging onto a protected resource (such as resource 101 in FIG. 1) using an existing credential. For the purposes of description, and without limitation, this description of FIG. 3 will assume that the protected resource is a corporate network.

The method proceeds to step 320, wherein a determination is made as to what reset policy applies to the user. As discussed further in relation to FIG. 4, an administrator may associate a user to an applicable reset policy according to what group(s) the user belongs to within the corporate network. For example, an administrator may decide, previous to the user's request to register, to apply a first reset policy to all members of the accounting group, while a second reset policy applies to all members of the shipping group. The first reset policy may be made more stringent (e.g., more questions, higher threshold of right answers to satisfy the policy, more gates, etc.) because the accounting department will generally have greater access to sensitive information on the network than members of the shipping department. In this instance, the administrator may create a rule that any member of a particular group is subject to a particular policy. Alternatively, an administrator may choose to delineate on a per-user basis what reset policy applies to that user, and the policy that applies to that individual user may be specified in a file associated with the user's identity (such as the user's name or user identification number).

Users may be members of more than one group within the corporate network (e.g., a user could be a member of both the accounting and sales groups). In this case, an administrator may, in embodiments, set a hierarchy of the multiple reset policies that have been defined. The hierarchy may rank the policies according to stringency (e.g., difficulty to satisfy). The administrator may then choose to set a rule that if the user is a member of more than one group, only the most stringent reset policy applying to one of the groups of which the user is a member will apply to the user. In this manner, the user will not be required to satisfy the reset policy that applies to every group of which the user is a member, which could otherwise be overly burdensome.

In embodiments, the determination step 320 may involve checking the user information supplied by the user against a list created by an administrator that associates users to particular reset policies. It may also comprises (a) checking the user information against a user directory to determine groups to which the user belongs; and (b) if the user belongs to more than one group, determining the most stringent reset policy that has been associated with one of those groups of which the user is a member.

Next, the method proceeds to step 330. In the embodiment shown, a first client gate specified by the applicable reset policy for the user is installed at the client. In embodiments, this step may also include installing at the client a gate framework module, if not already installed.

Next, the user is presented 340 with the first gate. For example, the user may be presented with a series of questions (mother's maiden name, high school attended, etc.). If the gate type is a smartcard gate, the user may be asked to scan the user's smartcard.

The method then proceeds to step 350, wherein a response is received from the user to the first gate. The response could be a single response including answers to all the questions or challenges of the first gate, or it could be a series of responses to iterative challenges of the first gate presented to the user.

A determination is made 360 whether any more gates are required by the applicable reset policy for this user. If not, the user registration information included in the response is stored and the process ends 362. If more gates are identified by the applicable reset policy for this user, the next client gate for the applicable reset policy is installed 364. Alternatively, all client gates specified in the applicable reset policy can be installed at the same time. The method proceeds to step 366, wherein the next gate is presented to the user. A response is received 368 from the user, and a determination is made 370 whether any more gates are specified by the applicable reset policy. If not, the user registration information included in the response is stored and the process ends 372. If so, the method loops back to step 364 until all gates specified by the applicable reset policy have been presented and responded to by the user.

User registrations, in embodiments, may be policy specific (i.e., a user must register for only the reset policy that applies to the user). In other embodiments, a user may register responses to all available gates. In this manner, the user may need to register less often if, for example, an administrator decides to mix and max existing gates for which the user has already registered responses. Responses to individual gates given during registration could then be stored separately per gate for comparison to responses to gate challenges during access attempts. For example, if a user registers for a reset policy that includes Gate 1, Gate 2, and Gate 3, the user would not need to re-register in this embodiment for a reset policy that comprised only Gate 1 and Gate 3.

Figure 4:
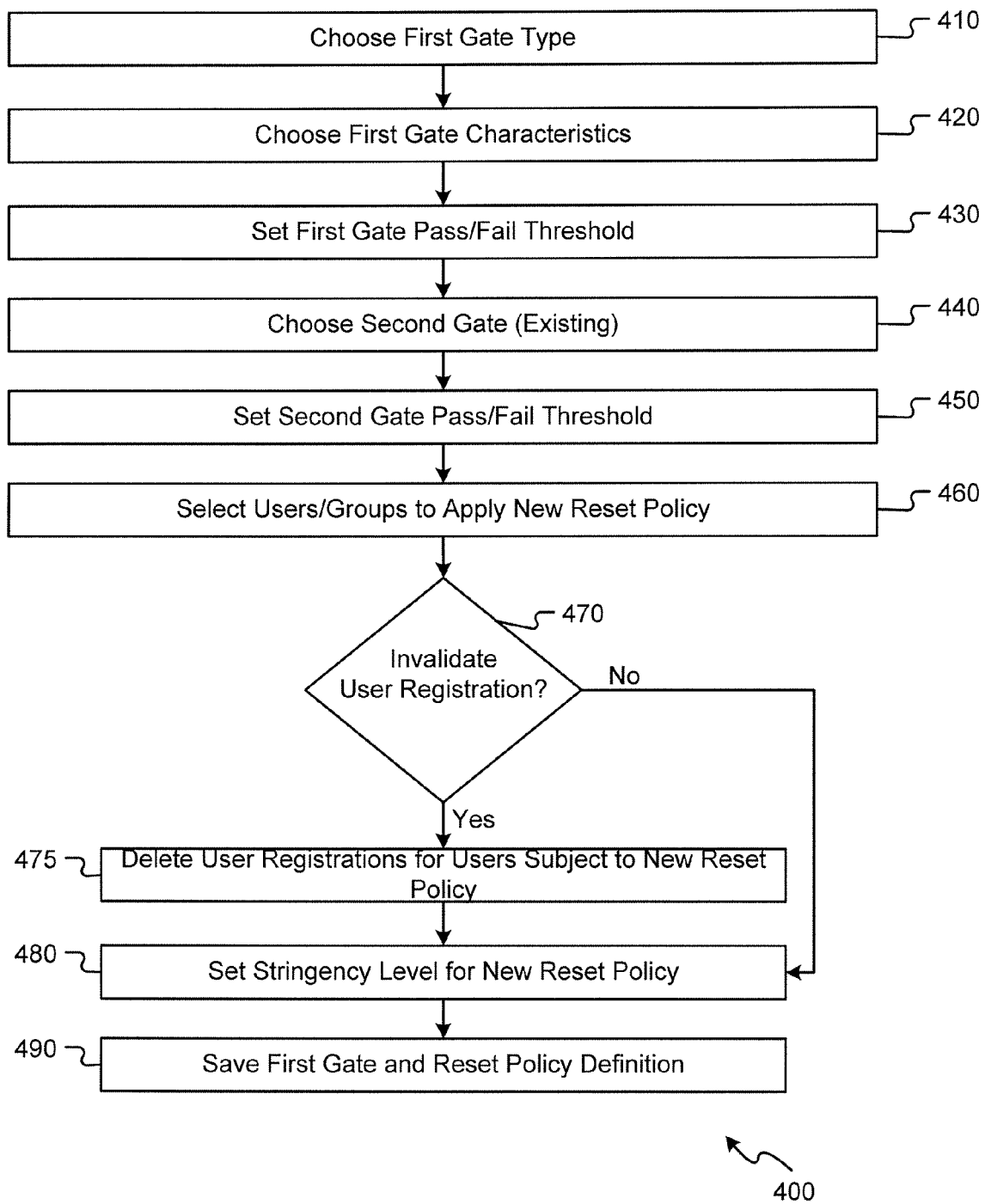
FIG. 4 illustrates an example of a method for administering gates and reset policies.

FIG. 4 illustrates an embodiment of a method for administering gates and reset policies. Reset policies may be created or changed by an administrator. In some embodiments, the administrator is presented with a UI listing all of the available gates for inclusion in a reset policy. The administrator may also create or import additional gates for inclusion into a reset policy. A first gate type is chosen to include in reset policy. For example, the administrator may choose a first gate type that is a smartcard gate or a question-and-answer gate. The characteristics of the first gate are then chosen 420. For example, if the first gate is a question-and-answer gate, the characteristics may include the number of questions and the text of the questions. This can be accomplished by configuring gate settings included in the first gate. The pass/fail threshold for the first gate is then set 430. For example, if the administrator has chosen to include a first gate that consists of ten questions, the administrator may decide that seven right answers from the ten questions are enough to pass the first gate. For other reset policies, the administrator may decide that all ten must be answered correctly to pass the gate. Accordingly, even if two reset policies use the same gate types and gate characteristics, the policies can differ based on the pass/fail threshold applied by the administrator for that reset policy. Alternatively, the pass/fail threshold could be included as part of the gate.

A second gate may then be added 440 to the new reset policy. In this embodiment, the second gate already has defined characteristics. The second gate could be an existing gate that the administrator is choosing to reuse for purposes of this new reset policy. The administrator may also choose to download a third-party's predefined gate and use it in the new policy. For example, a third party may have created an authentication mechanism that can be downloaded as a DLL and used as a gate that is part of a reset policy.

The pass/fail threshold for the second gate is then set 450. If the second gate is a smartcard gate, for example, the pass/fail threshold may comprise simply a yes/no decision whether the user presents the same smartcard when requesting credential reset as the user presents during registration.

In the embodiment shown, the reset policy comprises only the first and second gates. The new reset policy is then applied 460 to users or groups of users. This can be accomplished in a variety of ways. For example, if the new reset policy was created to accommodate a new group of users, the new group of users may be prompted (e.g., by email or at next sign-on) to register pursuant to the new reset policy.

If the new policy is applied to an existing group of users, a determination can be made 470 whether the user registrations for the users in that group should be deleted. For example, if the new reset policy is significantly different or more stringent from the old reset policy that applied to those users, a determination may be made to delete 475 the old user registrations that were based on the old reset policy. This would require those users to re-register based on the new reset policy. Otherwise the user registrations under the old reset policy are unaffected and only new users added to the affected group are required to register according to the new reset policy.

In embodiments, the administrator also sets 480 a stringency level for the new reset policy. As discussed, if a user is a member of more than one group, the applicable reset policy may be the policy that is the most stringent. By setting the stringency level of each new reset policy, the administrator can create a hierarchy of reset policies that can be used to apply only the most stringent policy that is associated with a group to which the user belongs. The method then proceeds to step 490 where the first gate and the definition of the reset policy are stored. To the extent the second gate was, in this example, an existing and previously stored gate, the second gate need not be stored again.

Figure 5:
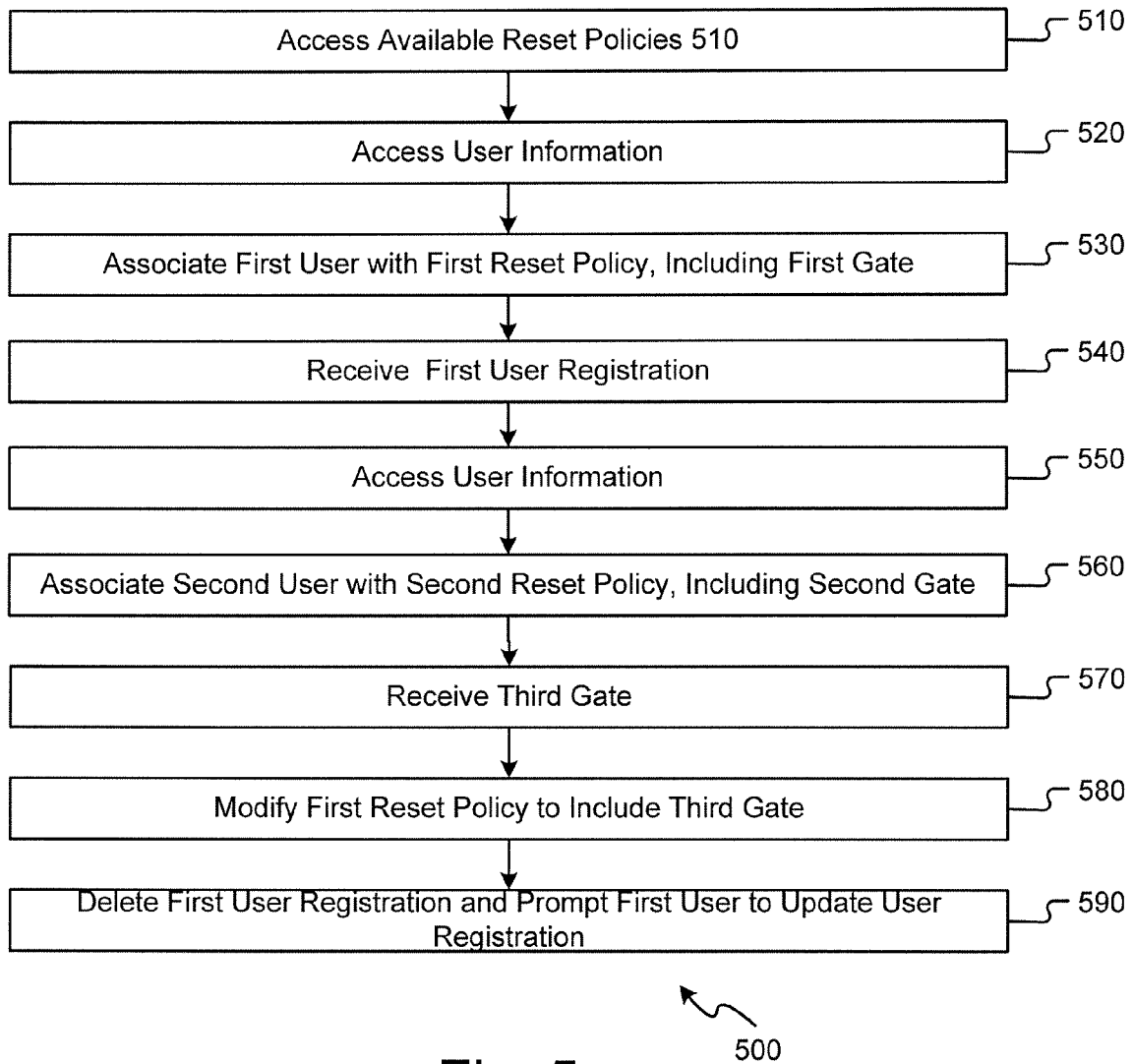
FIG. 5 illustrates another example of a method for administering gates and reset policies and associating reset policies with users.

FIG. 5 illustrates another method 500 for administering gates and reset policies and associating reset policies with users. Available reset policies are accessed. In embodiments, reset policy definitions are stored in a database, and an administrator may read existing reset policy definitions through a UI to determine whether to apply an existing reset policy to a user or group of users. Accessing available reset policies includes, without limitation, downloading or reading reset policy definitions from a database or other computer storage media. The method proceeds to step 520, when user information is accessed. In embodiments, user information may comprise user identifying information, such as user names or user identification numbers. User information may also comprise information identifying groups to which the users belong. User information may also include information identifying permissions that users are granted within a resource. User information may be accessed, in embodiments, from a user directory system, a database, or other storage media.

At step 530 a first user is associated with a first reset policy, which may include a first gate. As discussed, the association of a user to a reset policy can be accomplished in a variety of ways. For example, the user identification number of the first user can be indexed to, and/or stored with, a pointer to the first reset policy (or first reset policy definition) in a database or other computer storage media. In other embodiments, an identifier indicating a group of which the first user is a member is indexed to, and/or stored with, a pointer to the first reset policy.

At step 540, a first user registration is received. The first user may register in the manner described elsewhere herein. In embodiments, the first user registration includes responses to gates included in the first reset policy.

At step 550, user information is again accessed. A second user is associated 560 with a second reset policy in the manner discussed. The second reset policy, in embodiments, is different from the first reset policy and includes a second gate. An administrator may choose, for example, based on user information to apply a second reset policy to the second user that is less stringent than the first reset policy because the second user does not have a high level of permissions within the resource.

At step 570, a third gate is received. The third gate may comprise a DLL from a third-party vendor that is stored in, or accessed from, a database or received from a different system. The third gate can be used, in embodiments, to modify 580 the first reset policy. For example, the first reset policy definition may be accessed by an administrator, modified to include both the first gate and the third gate, and stored in a database or other storage media.

If the first reset policy is modified significantly (e.g., such that the first reset policy is now more stringent than before modification), the first user registration may be deleted 590 and the first user may be prompted to update the first user's registration. For example, if the third gate is added to the first reset policy, the administrator may decide that all users who previously registered using the first reset policy must now reregister because previous registrations are no longer valid. This can be accomplished, in embodiments, by searching a database for user registrations associated with the first reset policy and having a time stamp prior to the modification of the first reset policy. The first user (and other users subject to the former first reset policy) could then be required upon login to reregister using the modified first reset policy.

Figure 6:
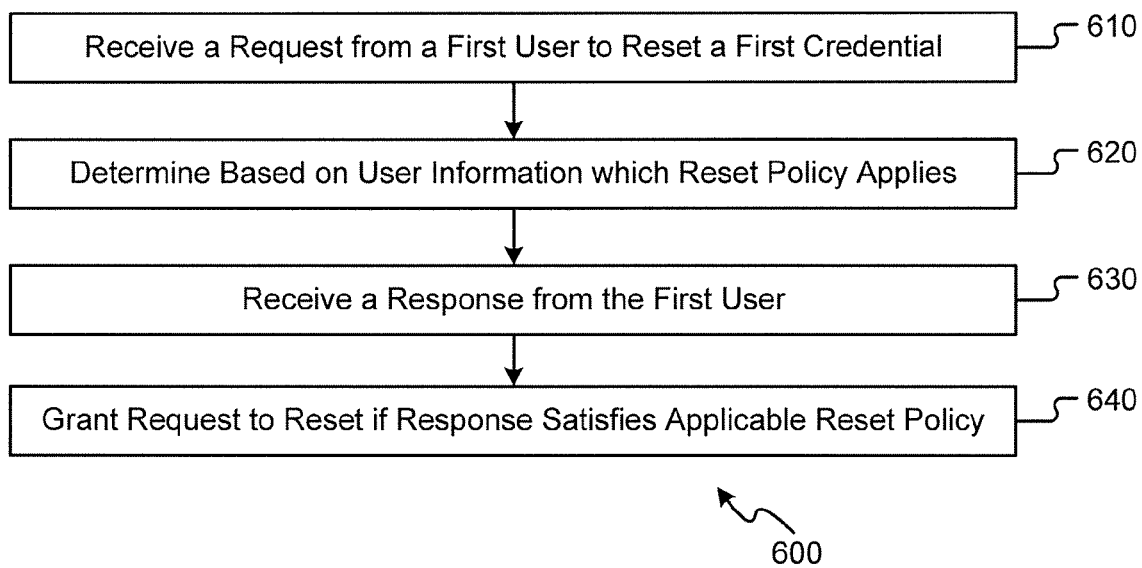
FIG. 6 illustrates an example of a method to determine whether to grant a request to reset a credential.

FIG. 6 illustrates a simple embodiment of a method 600 to determine whether to grant a request to reset a first credential. A first request is received 610 from a first user to reset a first credential, such as a password used to access a resource. Based on user information in the first request, it is determined 620 which reset policy applies to the first user. A response is received 630 from the first user. The request to reset the first credential is granted 640 if the response from the first user satisfies the applicable reset policy.

Figure 7A:
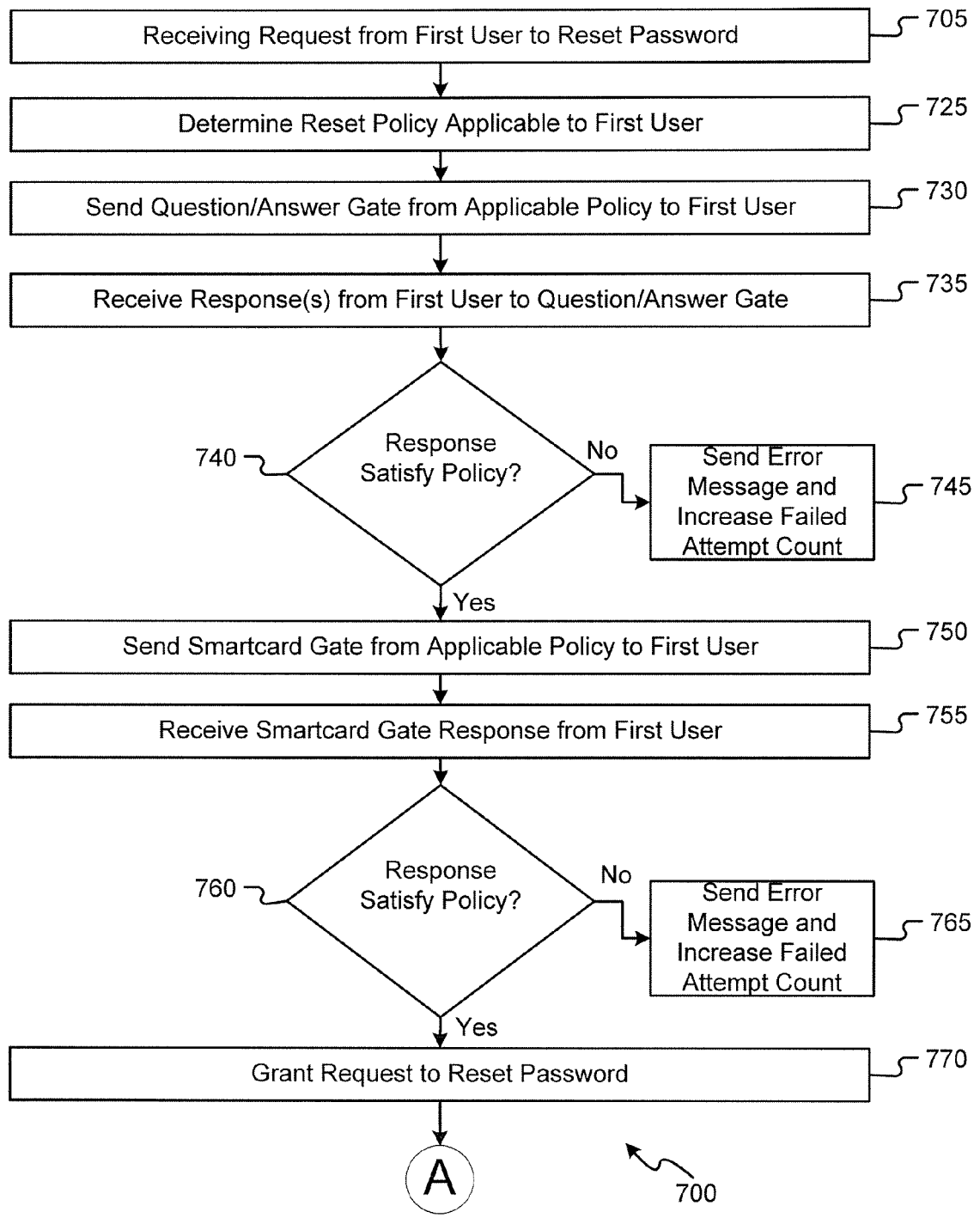
FIGS. 7A and 7B illustrate an example of a method to determine whether to grant a request to reset a credential.
Figure 7B:
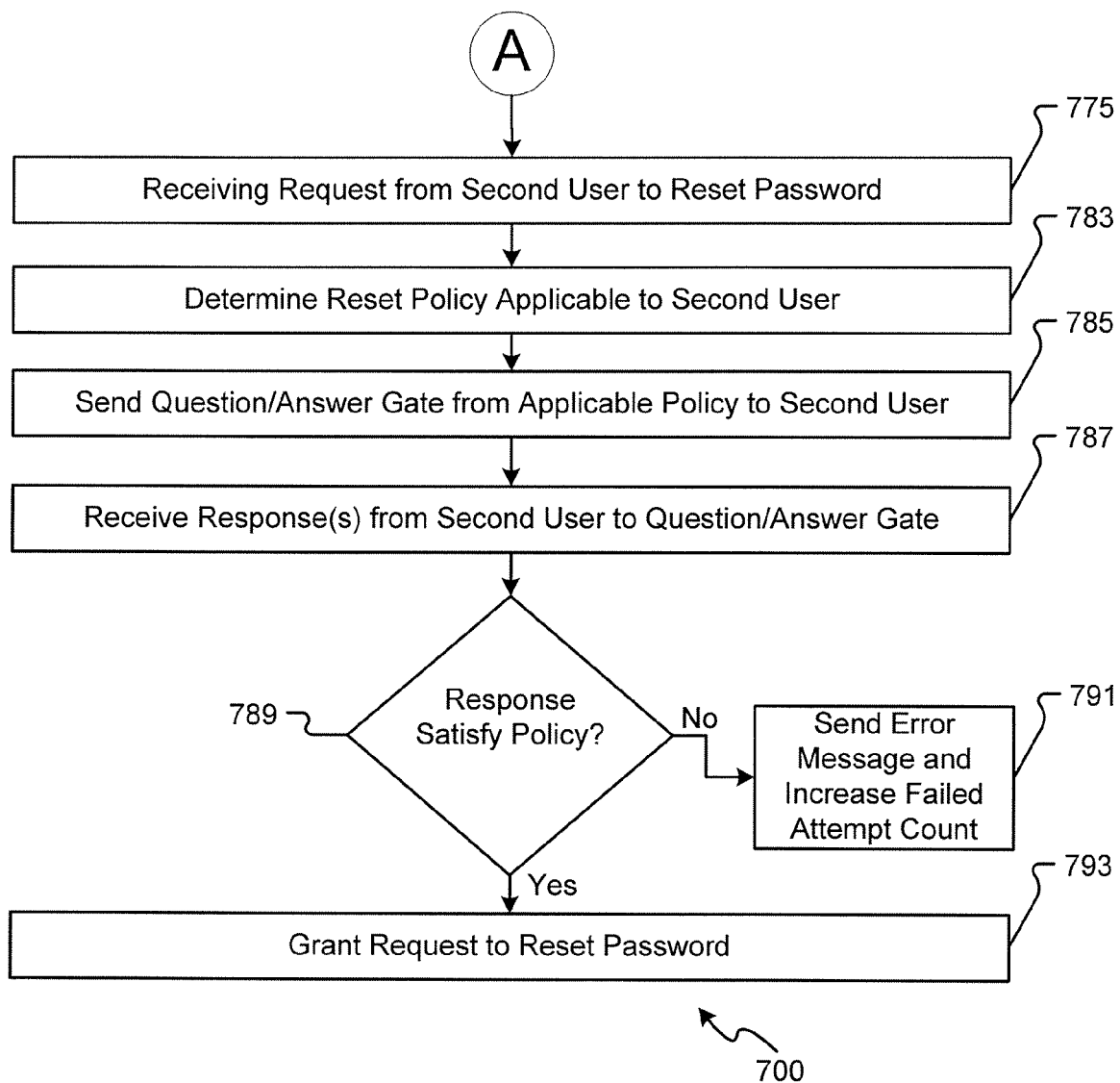

FIGS. 7A and 7B illustrate another embodiment of a method 700 for determining whether to grant a request to reset a first credential. In this example embodiment, the credential is a password. A request is received 705 from a first user to reset a password. A determination is made 725 as to which reset policy is applicable to the first user. In embodiments, the determination is made 725 by mapping first user information received from the user as part of the request 705 to the applicable reset policy. For example, if the user registered for self-service credential reset pursuant to a first reset policy chosen by an administrator based on the user's permissions within the protected resource, the user's information (e.g., user name) may be indexed to the user registration and the applicable reset policy definition. Determining step 725, in this embodiment, may comprise mapping the user information to the applicable reset policy (e.g., by accessing the reset policy definition indexed to the user information in a database or other storage media). In this example, the applicable reset policy comprises a first question-and-answer gate and a second smartcard gate.

The method proceeds to step 730 where the question-and-answer gate is sent to the first user. A response to the question-and-answer gate is received 735. A determination is then made 740 whether the response satisfies the applicable reset policy. For example, the applicable reset policy may require that 4 of 5 questions included in the question-and-answer gate match the answers provided by the first user during his registration. If the response does not satisfy the applicable reset policy, the first user is sent 745 an error message and the failed-attempt count is increased by one. The failed-attempt count can be used to lock out the first user from further attempts to reset his password if the failed-attempt count reaches a predetermined threshold.

If the response to the first gate satisfies the applicable reset policy, the method proceeds to step 750, where the smartcard gate is sent to the first user. A response to the smartcard gate is then received 755 from the first user. For example, the first user may swipe his smartcard at a smartcard reader. A determination is then made 760 whether the smartcard response from the first user satisfies the applicable reset policy. In embodiments, this can be accomplished by forwarding the results of the user's smartcard scan to the certificate server the user identified upon registration. The certificate server then indicates whether the smartcard is valid. If not, the first user is sent 765 an error message and the failed-attempt count is increased by one. If the smartcard response from the first user satisfies the applicable policy, the first user's request to reset his password is granted 770.

The method then proceeds to FIG. 7B, wherein a request from second user to reset her password is received 775. A determination is made 783 as to which reset policy is applicable the second user. In this example, the applicable reset policy comprises only a question-and-answer gate with a different number of questions and different content of questions from the question-and-answer gate presented to the first user.

The method proceeds to step 785 where the question-and-answer gate is sent to the second user. A response to the question-and-answer gate is received 787. A determination is then made 789 whether the response satisfies the applicable reset policy. For example, the applicable reset policy may require that 3 of 4 questions included in the question-and-answer gate match the answers provided by the second user during his registration. If the response does not satisfy the applicable reset policy, the second user is sent 791 an error message and the failed-attempt count is increased by one. If the response to the first gate satisfies the applicable reset policy, the method proceeds to step 793, where the first user's request to reset his password is granted 770.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the claimed system and methods may be practiced without one or more of the specific details, or with other methods, resources, materials, etc. In other instances, well known structures, resources, or operations have not been shown or described in detail merely to avoid obscuring aspects of the claimed systems or methods.

While example embodiments and applications have been illustrated and described, it is to be understood that the claims are not limited to the precise configuration and resources described above. Various modifications, changes, and variations apparent to those skilled in the art may be made in the arrangement, operation, and details of the methods and systems disclosed herein without departing from the scope of the claims.

We claim:

1. A method for determining whether to permit a user to reset a credential used to access a resource, comprising the steps of:
   receiving, by at least one processing unit, a first request from a first user to reset a first credential, wherein the first request includes first user information;
   determining, based at least on the first user information, an applicable reset policy from among at least a first reset policy comprising a first gate and a second reset policy comprising a second gate identical to the first gate, wherein the first reset policy comprises a different pass/fail threshold than the second reset policy;
   receiving a response from the first user; and
   granting the first request if the response satisfies the applicable reset policy;
   wherein the determining step further comprises determining:
      that the first user is a member of both a first group having a first set of permissions within the resource and a second group having a second set of permissions within the resource;
      that the first reset policy is associated with users in the first group and the second reset policy is associated with users in the second group;
      that the first reset policy is more stringent than the second reset policy based on a ranking of the first reset policy and the second reset policy according to stringency; and
      that the applicable reset policy is the first reset policy and not the second reset policy.

2. The method of claim 1, wherein the first credential includes a password and the first user information includes a user name.

3. The method of claim 1, wherein the applicable reset policy is the first reset policy and the first reset policy includes a first gate, further comprising the step of:
   after the step of determining, sending the first gate to the first user.

4. The method of claim 1, wherein:
   the first reset policy includes at least a first gate and a second gate, and the second gate is different from the first gate;
   the step of receiving a response includes receiving a first response to the first gate and a second response to the second gate; and
   the step of granting the first request comprises granting the first request if the first response satisfies the first gate and the second response satisfies the second gate.

5. The method of claim 1, wherein the first reset policy includes at least a first gate, the second reset policy includes at least a second gate, and the first gate is of a different type from the second gate.

6. The method of claim 1, wherein the first reset policy includes at least a first gate, the second reset policy includes at least a second gate, and the first gate is of the same type as the second gate but has different characteristics from the second gate.

7. The method of claim 1, wherein the first user information includes an identifier corresponding to the first user and the step of determining includes using the identifier to look up a first user registration stored in computer storage media.

8. A system for determining whether to allow users to reset credentials protecting a resource, comprising:
   a processing unit; and
   a memory coupled with and readable by the processing unit and having stored therein instructions which, when executed by the processing unit, cause a credential reset module to perform the following acts:
   receiving, by at least one processing unit, a first request from a first user to reset a first credential, wherein the first request includes first user information;
   determining, based at least on the first user information, an applicable reset policy from among at least a first reset policy comprising a first gate and a second reset policy comprising a second gate identical to the first gate, wherein the first reset policy comprises a different pass/fail threshold than the second reset policy;
   receiving a response from the first user; and
   granting the first request if the response satisfies the applicable reset policy;
   wherein the determining step further comprises determining:
      that the first user is a member of both a first group having a first set of permissions within the resource and a second group having a second set of permissions within the resource;
      that the first reset policy is associated with users in the first group and the second reset policy is associated with users in the second group;
      that the first reset policy is more stringent than the second reset policy based on a ranking of the first reset policy and the second reset policy according to stringency; and
      that the applicable reset policy is the first reset policy and not the second reset policy.

9. A storage device encoding a computer executable instructions that, when executed by at least one processor, perform a method for setting requirements to permit reset of a credential used to access a resource, the method comprising:
   associating a first user with a first group and a second group;
   associating the first group with a first reset policy comprising a first gate and the second group with a second reset policy comprising a second gate identical to the first gate, wherein the first reset policy comprises a different pass/fail threshold than the second reset policy, and wherein the first reset policy comprises a different pass/fail threshold than the second reset policy;
   ranking at least the first reset policy and the second reset policy based on stringency;
   receiving a request for access to the resource from the first user;
   determining that the first user is associated with the first group and the second group;
   determining that the first reset policy is more stringent based on the ranking;
   requiring the user to satisfy the first reset policy and not the second reset policy;
   receiving a response from the first user;

when the response from the first user satisfies the first reset policy, allowing the first user to access the resource.

10. The storage device of claim 9, wherein the first reset policy includes at least a first gate, the second reset policy includes at least a second gate, and further comprising:
receiving a third gate; and
modifying the first reset policy to include the third gate.

11. The storage device of claim 10, wherein the third gate comprises a dynamically linked library.

12. The system of claim 8, wherein the first reset policy includes at least a first gate, the second reset policy includes at least a second gate, and the first gate is of a different type from the second gate.

13. The system of claim 8, wherein the first reset policy includes at least a first gate, the second reset policy includes at least a second gate, and the first gate is of the same type as the second gate but has different characteristics from the second gate.

* * * * *